United States Patent
Dandrow et al.

(10) Patent No.: US 12,241,997 B2
(45) Date of Patent: Mar. 4, 2025

(54) ARTIFICIAL INTELLIGENCE FOR THE CLASSIFICATION OF SIGNALS FOR RADAR DETECTORS

(71) Applicant: NoLimits Enterprises, Inc., Cincinnati, OH (US)

(72) Inventors: Jonathan Dandrow, Cincinnati, OH (US); Sterling Nesbitt, East Lyme, CT (US)

(73) Assignee: NoLimits Enterprises, Inc., Cincinnati, OH (US)

( * ) Notice: Subject to any disclaimer, the term of this patent is extended or adjusted under 35 U.S.C. 154(b) by 371 days.

(21) Appl. No.: 17/614,980

(22) PCT Filed: Jun. 1, 2020

(86) PCT No.: PCT/US2020/035532
§ 371 (c)(1),
(2) Date: Nov. 29, 2021

(87) PCT Pub. No.: WO2021/050123
PCT Pub. Date: Mar. 18, 2021

(65) Prior Publication Data
US 2022/0244354 A1    Aug. 4, 2022

Related U.S. Application Data (60) Provisional application No. 62/855,111, filed on May 31, 2019.

(51) Int. Cl.
*G01S 7/41*    (2006.01)
*G01S 7/02*    (2006.01)
(Continued)

(52) U.S. Cl.
CPC .............. *G01S 7/417* (2013.01); *G01S 7/022* (2013.01); *G01S 13/931* (2013.01); *G06N 3/08* (2013.01);
(Continued)

(58) Field of Classification Search
CPC ........ G01S 7/417; G01S 7/022; G01S 13/931; G01S 2013/932; G01S 2013/9321; G06N 3/08
See application file for complete search history.

(56) References Cited

U.S. PATENT DOCUMENTS 6,084,510 A * 7/2000 Lemelson ............... G08G 1/164
                                                    382/104
6,526,352 B1 * 2/2003 Breed .................. G01S 19/071
                                                    701/470
(Continued)

FOREIGN PATENT DOCUMENTS

CN     108564006 A  *  9/2010  ........... G06K 9/0063
CN     103837867 A  *  6/2014  ........... G01S 7/4026
(Continued)

OTHER PUBLICATIONS

McAlis G, JP-2002514298-A (Year: 1997).*
(Continued)

*Primary Examiner* — Ladimir Magloire
*Assistant Examiner* — Maxine McKenzie Phillips
(74) *Attorney, Agent, or Firm* — Wood Herron & Evans LLP (57) ABSTRACT

A radar detector (10) comprises a radar receiver (12) for receiving and characterizing the signal characteristics of a radar signal and providing one or more of radar frequency, radar intensity and radar direction to a control system (13) which comprises a neural network (42) structured in multiple layers, each layer processing signal characteristics
(Continued)

delivered thereto to develop neural pathways associated with the distinguishing signatures of the signal characteristics provided to the neural network. The network thus distinguishes law enforcement-originated and non-law enforcement-originated radar signals in an adaptable manner that does not rely upon traditional logic programming of the detector system. Training, deployment and further learning and retraining of the neural network are described, as is the use of multiple and disparate vehicle environment and operation signals.

30 Claims, 11 Drawing Sheets

(51) Int. Cl.
  *G01S 13/931* (2020.01)
  *G06N 3/08* (2023.01)
(52) U.S. Cl.
  CPC . *G01S 2013/932* (2020.01); *G01S 2013/9321* (2013.01)

(56) References Cited

U.S. PATENT DOCUMENTS

| | | | |
|---|---|---|---|
| 6,861,970 B1 | 3/2005 | Garland | |
| 9,159,023 B2* | 10/2015 | Bone | B60W 30/18163 |
| 10,176,388 B1* | 1/2019 | Ghafarianzadeh | G06V 10/94 |
| 2004/0162644 A1* | 8/2004 | Torii | G06N 3/045 |
| | | | 701/1 |
| 2006/0284756 A1 | 12/2006 | Orr et al. | |
| 2007/0021915 A1* | 1/2007 | Breed | G01S 19/42 |
| | | | 701/301 |
| 2013/0218603 A1* | 8/2013 | Hagelstein | G06F 3/0481 |
| | | | 705/4 |
| 2016/0019458 A1* | 1/2016 | Kaufhold | G01S 13/9029 |
| | | | 706/20 |
| 2017/0090012 A1 | 3/2017 | Kuhn et al. | |
| 2018/0245941 A1* | 8/2018 | Baldauf | G06V 20/56 |
| 2018/0247160 A1* | 8/2018 | Rohani | G05D 1/0246 |
| 2019/0102840 A1* | 4/2019 | Perl | G06Q 40/08 |
| 2020/0341109 A1* | 10/2020 | Meissner | G01S 7/023 |

FOREIGN PATENT DOCUMENTS

| | | | |
|---|---|---|---|
| CN | 107290746 A * | 10/2017 | |
| CN | 108226892 A * | 6/2018 | G01S 7/41 |
| CN | 108369270 A * | 8/2018 | G01S 3/14 |
| CN | 108596081 A * | 9/2018 | G06K 9/00791 |
| DE | 102018000880 B3 * | 2/2019 | B60K 31/00 |
| JP | 3795752 B2 * | 7/2006 | G08G 1/08 |
| JP | 2011157067 A * | 8/2011 | |
| WO | WO-0113141 A2 * | 2/2001 | G01S 13/34 |
| WO | WO-2019048070 A1 * | 3/2019 | B60W 40/09 |

OTHER PUBLICATIONS

Kono S, JP-H066182-A (Year: 1994).*
RD-499057-A, Nov. 10, 2005, RD, Anonymous.*
Wan et al. "LPI Radar Waveform Recognition Based on CNN and TPOT." In: Symmetry. May 27, 2019, [online] retrieved on Feb. 3, 2021 (Feb. 3, 2021)] Retrieved from the Internet < URL: <https://www.mdpi.com/2073-8994/11/5/725> >.
Lu et al. "A Deep Learning-Based Satellite Target Recognition Method Using Radar Data." In: Sensors (Basel). May 2019; 19(9): 2008. Published online Apr. 29, 2019, [online] [retrieved on Feb. 3, 2021 (Feb. 3, 2021)] Retrieved from the Internet < URL: https://www.ncbi.nlm.nih.gov/pmc/articles/PMC6540144/.
PCT/US2020/035532, International Search Report and Written Opinion, mailed Mar. 24, 2021.

* cited by examiner

ARTIFICIAL INTELLIGENCE FOR THE CLASSIFICATION OF SIGNALS FOR RADAR DETECTORS

BACKGROUND OF THE INVENTION

The present invention relates to the discrimination of law enforcement radar signals from collision avoidance radar systems and other sources of radar signals.

Traditionally, radar detectors include circuitry or systems for identifying incoming radar signals and characterizing those signals by strength, direction or location, frequency and/or on/off patterns. This information is fed to a programmed digital signal processing system which applies frequency filters, location/direction filters, database lookups that characterize known sources, all feeding through traditional logic if-then-else statements, state machines performing analysis of behavior over time, chirp compression filters, and similar logical systems to process the incoming signals. These methods have been developed over many years and have become increasingly complex as a greater number and diversity of non-law enforcement radar sources appear on the open roads, from such diverse sources as collision avoidance/driver assistance systems, roadside traffic sensors, door openers and other non-traffic fixed radar sources, and even poorly shielded radar detectors.

SUMMARY OF THE INVENTION

According to principles of the present invention, an artificial intelligence type neural network is applied to the problem of classification and discrimination of radar sources. Specifically, an artificial intelligence deep neural network classifies radar sources received into a radar detector.

In the disclosed specific embodiments, the neural network receives various data inputs on incoming radar signals, including any or all of those data inputs previously employed in radar detection, such as signal frequency spectra, a time-referenced amplitude signal, signal phase, and real/complex components of a signal, frequency range strengths, frequency range signal strength time dependencies, signal geolocations/directions, and a combination of any or all of these.

The neural network may further receive inputs on vehicle condition including but not limited to accelerometer data indicating vehicle velocity, braking, acceleration, collision or cornering information for example as produced by an accelerometer, cabin sounds captured by a microphone, video of the surrounding area of the vehicle, proximity sensor data reflecting the environment surrounding the vehicle, vehicle operating data, vehicle make or model information, and/or any vehicle information accessible from a vehicle data bus such as via an OBD connector.

In one specific embodiment the neural network may consist of multiple deep layers including, but not limited to: convolutional layers, max pooling layers, dropout layers, fully connected layers, recurrent layers, and long short-term memory (LSTM). The case of LSTM layers may prove especially helpful for input data that undergoes meaningful temporal changes (e.g. accelerometer data that changes with respect to time, radar sources with amplitude that changes with respect to time, and any other signal that changes with respect to time). The neural network may be multi-class, with an output class for each radar source that may be encountered. The neural network may also be multi-label, where each output class can be present simultaneously and concurrently with and without any combination of the other output classes. In the case of a multi-label neural network multiple radar sources and threats can be present at the same time, and the neural network may discriminate and classify each radar source and treat each individually.

In one specific embodiment the neural network may consist of a reinforcement learning agent. A reinforcement learning agent samples its environment, makes multiple decisions, and is ultimately rewarded or penalized based on a reward function defined by the user. In one specific embodiment the environment sampled by the reinforcement learning agent can consist of, but not limited to, the following; accelerometer data indicating vehicle velocity, braking, acceleration, collision or cornering information for example as produced by an accelerometer, cabin sounds captured by a microphone, video of the surrounding area of the vehicle, proximity sensor data reflecting the environment surrounding the vehicle, vehicle operating data, vehicle make or model information, and/or any vehicle information accessible from a vehicle data bus such as via an OBD connector. The decisions the reinforcing learning agent makes could consist of, but is not limited to, the following; driving route to take (to avoid traffic, police enforcement, etc. based on the various data and time of day) the suggested speed to take, lane selection, whether (and when) to pass a car, or any number of other driving decisions. The reward model could be, but not limited to, the following: a preprogrammed model by the software engineers, a button or UI interface the user can use to give feedback to the neural network on whether the user concurred with decisions made by the reinforcement learning agent.

In the one specific embodiment, a supervised initial training of a neural network uses an initial set of known-origin signals, which may include those known to originated either from law enforcement radar and/or non-law enforcement sources. In one embodiment only signals originated from non-law enforcement radar sources are utilized. In this training, the neural network develops neural pathways to recognize the known-origin radar signals. It will be appreciated that the known-origin signals may be collected via laboratory simulation of known publicly occurring radar signals or collection of publicly occurring radar signals gathered in field surveys of the target radar environment(s). In an alternative embodiment, the neural network may be trained in an unsupervised manner using signals of unknown origin which are typical publicly occurring signals. In the latter case the neural network will learn to distinguish the various signals and report the signal source. Alternatively, or in addition, the neural network may also learn to distinguish behaviors that are associated with the law enforcement-originated signals enabling the neural network to identify a signal as law enforcement originated. For example, law enforcement originated signals have an intermittent nature, tend to suddenly appear, and tend to correlate with driver behaviors such as slower speeds or braking when drivers recognize that speed monitoring is occurring. The neural network can identify these correlated effects and use them to identify a signal as law enforcement-originated without supervised training.

The initially trained neural network may then be deployed on a radar detector; once deployed in the radar detector the neural network may use its trained neural pathways to classify the source of incoming radar signals and specifically to identify the source as either law enforcement radar or non-law enforcement originated interference sources, and from this determination a radar detector may filter false alert signals during operation.

In one embodiment, the initially trained neural network further improves its operation by retraining neural pathways based upon characteristics of signals encountered by the neural network while operating in the field (known as "transfer learning"), so that those signals may be characterized as law enforcement-originated or non-law enforcement-originated based upon signal characteristics, vehicle behaviors and/or input from a user of the radar detector. These additional imprinted neural pathways of the radar detector may then improve discrimination of law enforcement-originated radar signals from non-law enforcement radar signals. This process may improve operation by imprinting neural pathways to recognize signals which are unique to a particular geographic area (such as a region in which different licensed bands or different law enforcement equipment is utilized), or which are unique to a particular deployment circumstance (such as the host automobile's on-board crash avoidance system).

It will be recognized that the neural network may learn neural network weights to recognize any number of additional fixed or in-vehicle technologies which appear in the environment where the neural network is deployed. In this respect the use of artificial intelligence/machine learning/neural networks has a unique advantage as compared to traditional radar detector control strategies which rely upon pre-programmed logic systems and can implement only a limited extent of field learning to the extent it is structured by the pre-programmed logic system.

In specific embodiments, the deployed neural networks on radar detectors in the field are subsequently connected to a host to provide details of the retrained neural pathways created therein to the host, such that the host may integrate those modified pathways into its existing neural networks, for improvement of the training of the neural network. Alternatively, or in addition, the connection to the host may permit the deployed radar neural network to be updated using improved training developed in this manner or other manners at the host.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE INVENTION

In the following detailed description of several illustrative embodiments, reference is made to the accompanying drawings that form a part hereof, and in which is shown by way of illustration specific preferred embodiment in which the invention may be practiced. These embodiments are described in sufficient detail to enable those skilled in the art to practice the invention, and it is understood that other embodiments may be utilized, and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments are defined only by the appended claims.

Figure 1:
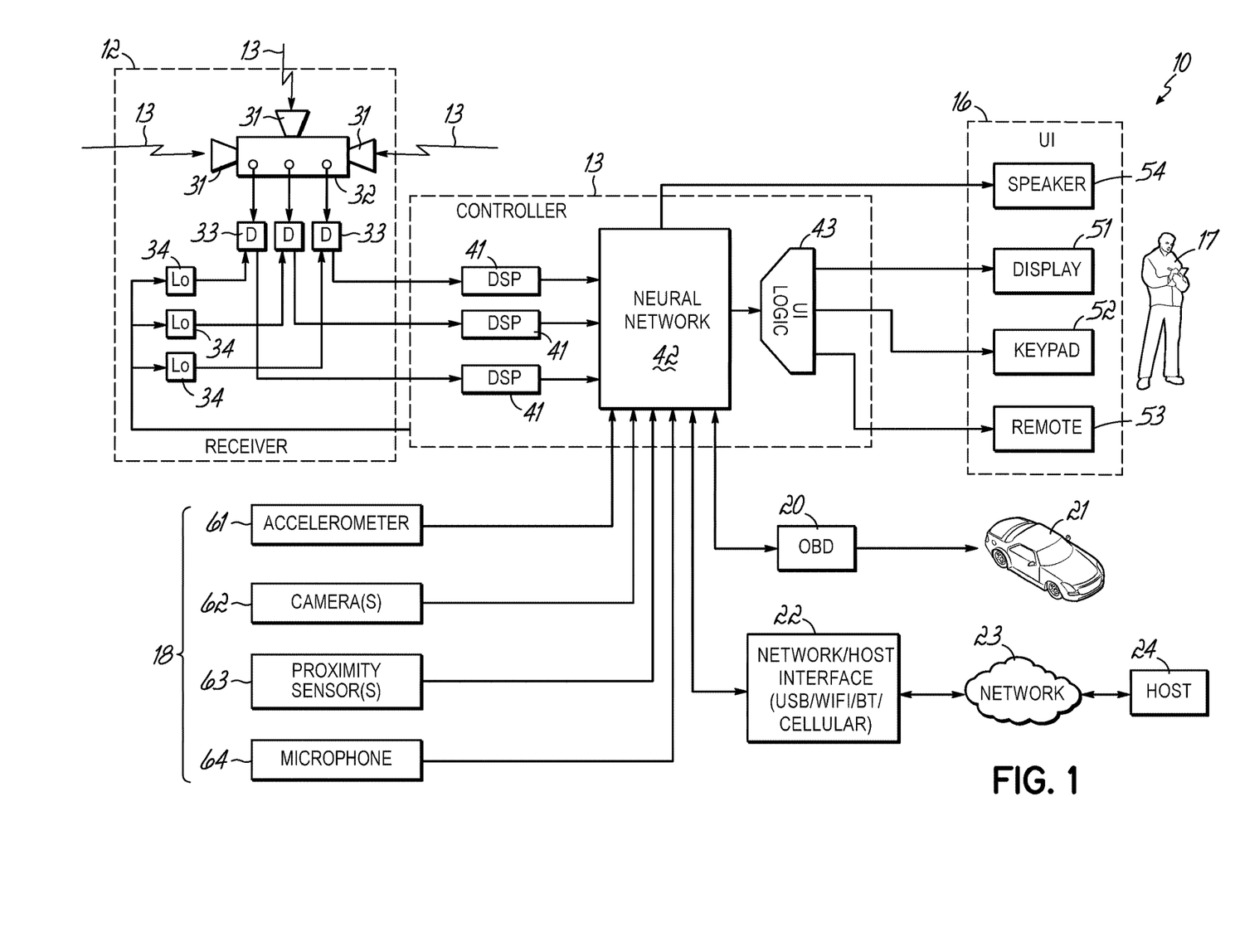
FIG. 1 is a schematic view of a radar detector utilizing a neural network.

FIG. 1 is a schematic view of a radar detector utilizing a neural network. The detector 10 generally comprises a receiver section 12, controller/filtering section 14, user interface 16, and (optionally) sensors 18.

The receiver section 12 receives radar signals 13 via one or several antenna such as horn antennae 13 shown in FIG. 1. These are fed through stripline, filtering and (optionally) low noise amplification stage 32. In one embodiment the signal is then fed to a demodulation stage 33 where the received radar signal is mixed with a local oscillator from a source 34. Although three antenna independently feeding three demodulation stages 33 using three local oscillator sources 34 are shown in FIG. 1, it will be appreciated that in other embodiments repetition of the front end radio frequency electronics can be avoided by multiplexing between multiple antennae through a switch. Furthermore, principles of the present invention are applicable to radar detectors having only a single antenna as well as to embodiments featuring multiple antennae.

The output(s) from the receiver section typically comprise an intermediate frequency demodulated signal representing the radio frequency content received in the antenna(e). This intermediate frequency content is typically in the form of a swept spectral representation of the content received by the antenna. Numerous methods have been developed and disclosed for the reception and demodulation of radio frequency signals from one or several antennae and will not be elaborated here. Importantly the demodulated intermediate frequency signals are delivered to the controller 14 where they are converted to digital signals, either in audio band or intermediate frequency band, and then processed through digital signal processing 41 to provide a sequence of spectral content snapshots to the neural network 42 which may use the same to identify a signal from its frequency, and/or amplitude or frequency modulation.

Neural network 42 implements the machine learning/artificial intelligence principles of the present invention, using the intermediate frequency demodulated signals from the receiver section as well as (optionally) signals from the sensors 18. Neural network 42 responds to this content and its internal neural pathways to discriminate between incoming radar signals from non-law enforcement sources and those from law enforcement sources, and produce an output indicating the results of this analysis. The output of the neural network is delivered to a user interface logic section 43 which assesses that output and determines whether to initiate an alert, such as a warning that radar determined to be from law enforcement sources has been identified.

Alerts are delivered to a user via the user interface 18 which is connected to and responsive to the user interface logic 43 of the controller 14. The user interface includes a display 51 for presenting information about the operation of the radar detector, including details about alerts which are identified by the controller 14, which are typically (but not necessarily) accompanied with a display readout and/or a speaker tone, chip or spoken voice. The user interface further includes a keypad 52 for receiving commands from the user (adjusting settings of the radar detector, acknowledging and/or muting alerts, and optionally providing user feedback on the nature (law enforcement-originated or not) of signals which have triggered an alert. The keypad may take the form of a series of keys or buttons on the housing of the radar detector. Optionally additional keys or buttons may be included on a remote device which may be positioned conveniently within the passenger cabin, or included on the detector power cord.

The radar detector controller 14 is also optionally responsive to a variety of sensor inputs, including for example an accelerometer sensor 61 for detecting acceleration, braking, cornering or collisions of the vehicle in which the radar detector is deployed. Also optionally included are one or more camera sensor(s) which detect conditions around the vehicle, such as the nature of the roadway, weather conditions, proximity of traffic, the behavior of traffic, the visible presence of law enforcement vehicles, and the like. Further, optional proximity sensors can similarly detect proximity of traffic and vehicles, lane positioning of the vehicle, and potentially roadway parameters. Also, a microphone sensor may be included to detect cabin sounds and thereby determine the operational state of the vehicle and an ambient temperature sensor can use vehicle temperature information to characterize operation as well.

Additional information useful in determining the operational state of the vehicle can be gathered from the vehicle's data bus, which will generally provide a range of data regarding the operation of the vehicles engine and main sensor systems. This data is optionally obtained in the illustrated embodiment via an On Board Diagnostics (OBD-II) connector 20 coupled to the data bus of the vehicle 21.

Finally, the detector may optionally interface with a host system, such as a central server, to acquire updates or deliver learned data to the host, or even to receive information on radar signals detected by other devices so that those signals can be fed to the neural network and used in development of neural pathways. This interface can be achieved in a variety of manners, such as via a network connector, USB connect, WiFi circuits, Bluetooth circuits, circuits supporting other 801.11 protocols such as Zigbee, or circuits supporting cellular connectivity, all of which are schematically represented by interface 22, and connect via the public network cloud 23 to the host 24.

Figure 2:
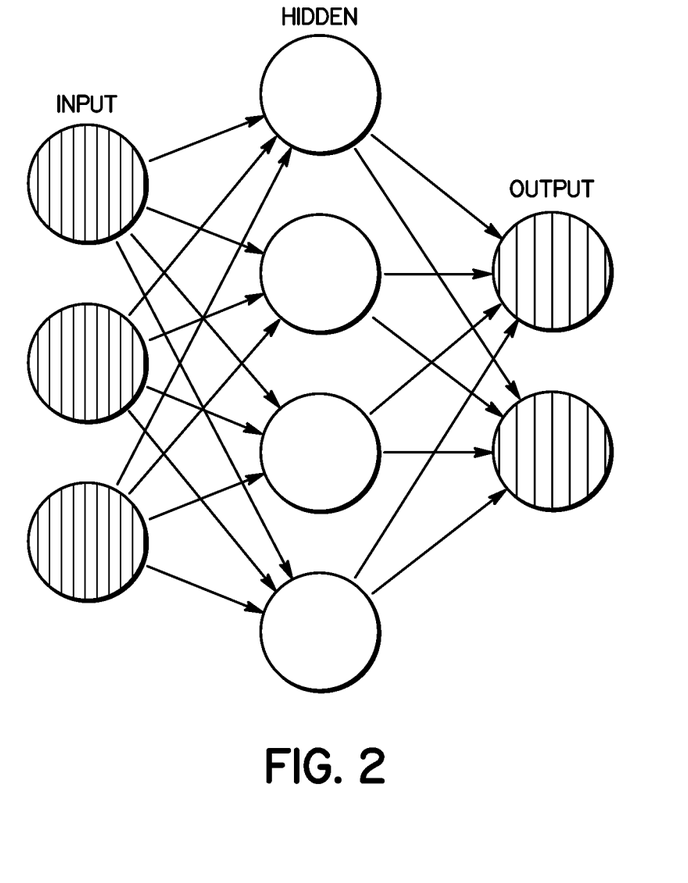
FIG. 2 shows a schematic view of a neural network.

FIG. 2 is a schematic view of a neural network. Signals of radar frequency intensities, GPS coordinates, speed, dash cam video, vehicle characteristics or vehicle system status or behavior, or other inputs are provided to the deep neural network at the input. The signals are further processed by hidden layers. The resulting output can be the classification of the signal as either real law enforcement radar, an automobile's IVT, or other interference. The radar detector can then determine whether to provide visual or audio feedback to the operator of the radar detector. The neural network has a layered architecture, where the layers can include, but are not limited to, the following; convolution (1D, 2D, or n dimensional), fully connected, relu, max pooling, average pooling, and long-short-term memory (i.e. recurrent neural networks).

Figure 3A:
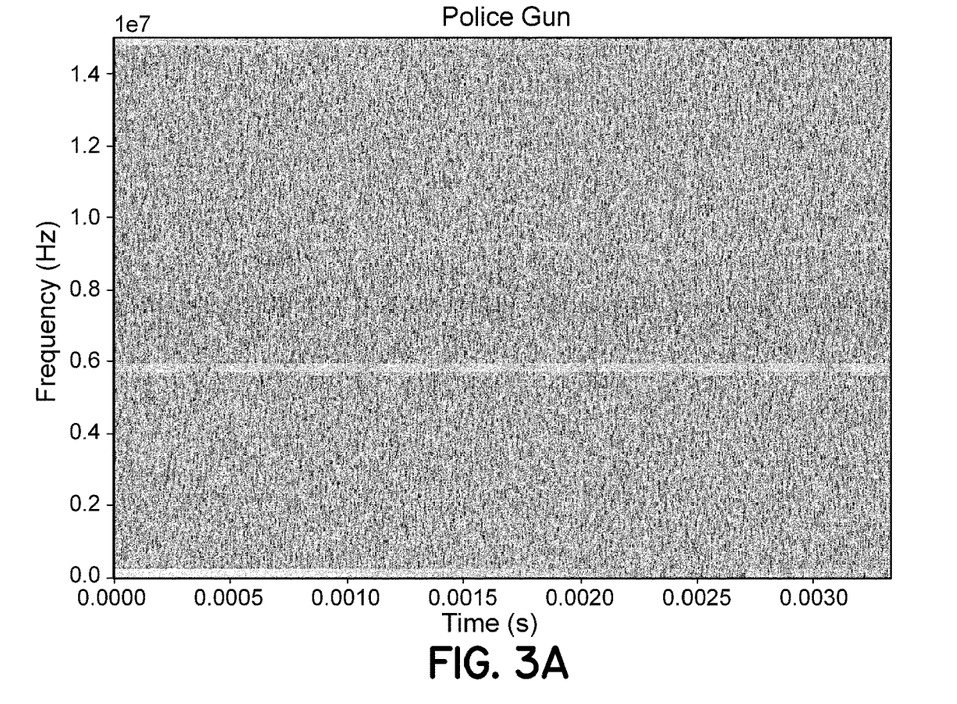
FIGS. 3A, 3B and 3C illustrate police radar gun, and Mazda and Cadillac vehicle driver assistance radar signals, respectively, used in a proof of concept experiment.
Figure 3B:
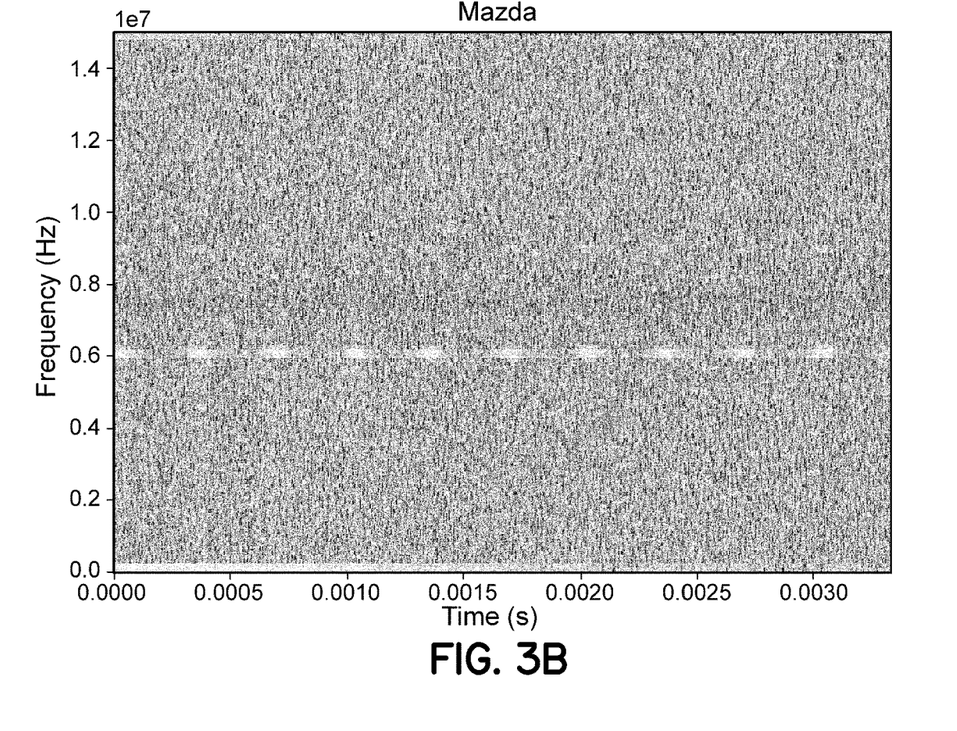
Figure 3C:
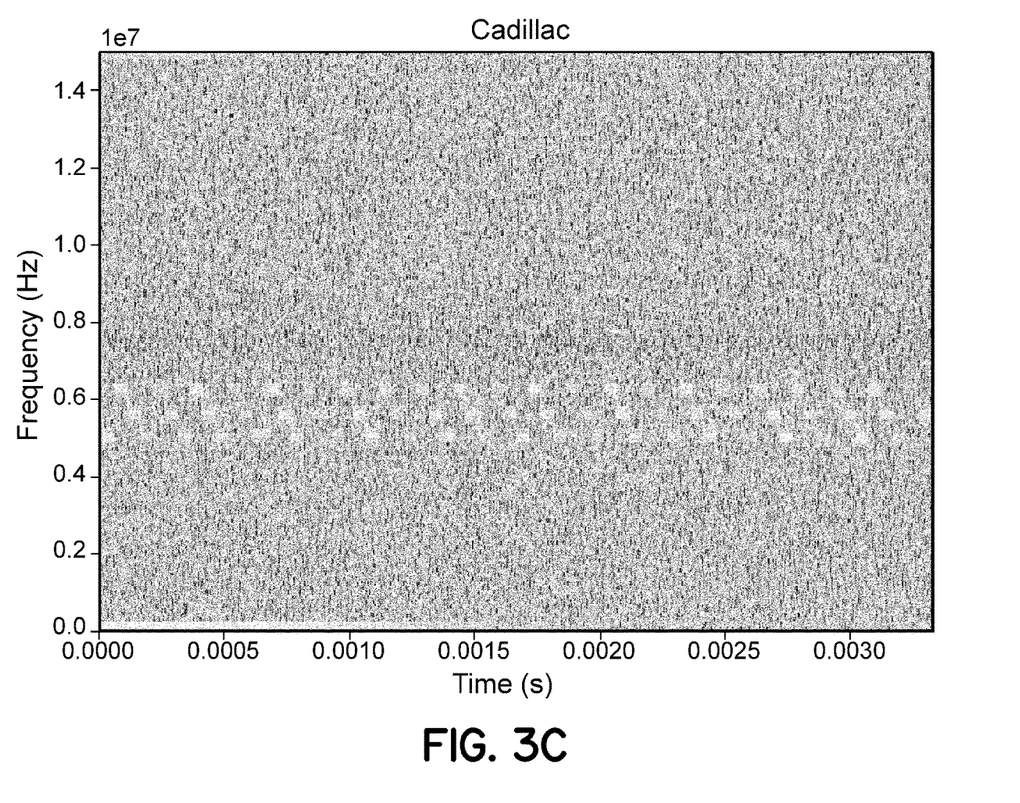

FIGS. 3A, 3B and 3C illustrate signals used in a proof of concept experiment. Specifically, the signal illustrated in FIG. 3A shows the radar cadence produced by a radar gun of the kind used by law enforcement. The signal illustrated in FIG. 3B shows the radar cadence produced by a Mazda driver assistance signal. Both the radar gun and Mazda signal are constant frequency, but have a time-modulating intensity which must be distinguished by the neural network via assessment of the incoming spectrum over time, which is accomplished by the delivering to the neural network a sample of the incoming signal, i.e., the time-domain modulating intensity of the incoming signal. Alternatively, data from several sequential frequency sweeps of the receiver may be delivered to the neural network. In either case, the time modulation of the signals can be identified. In contrast to the Mazda system, the Cadillac driver assistance system produces a radar signal as shown in FIG. 3C, with a modulating frequency, which can similarly be identified by evaluation of the time-domain modulating intensity of the incoming signal or by comparison of several frequency sweeps of the receiver.

Figure 4A:
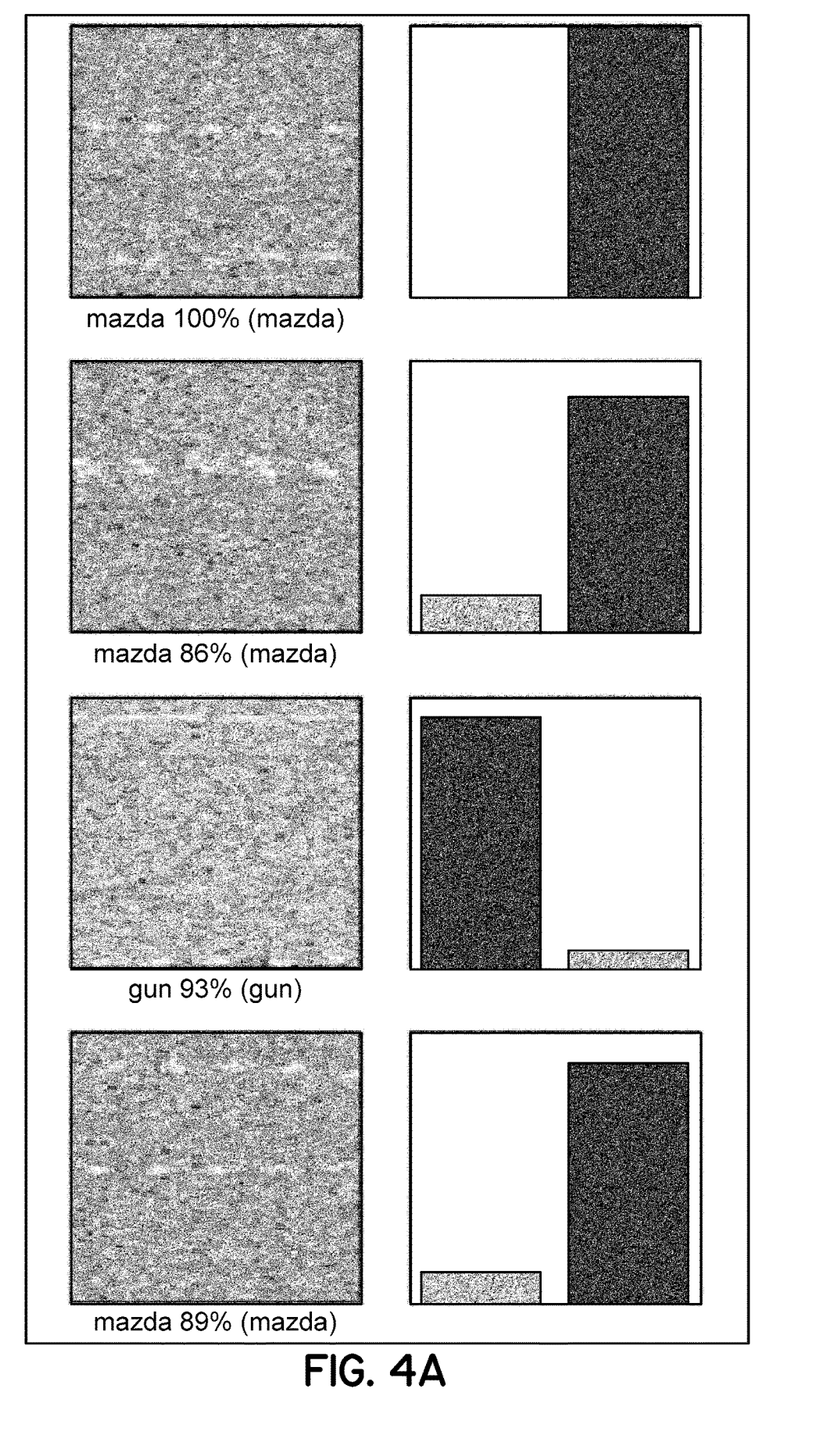
FIGS. 4A, 4B and 4C illustrates spectra generated and processed by a neural network to discriminate a signal source, including in cases where multiple sources are present, in the proof of concept experiment.
Figure 4B:
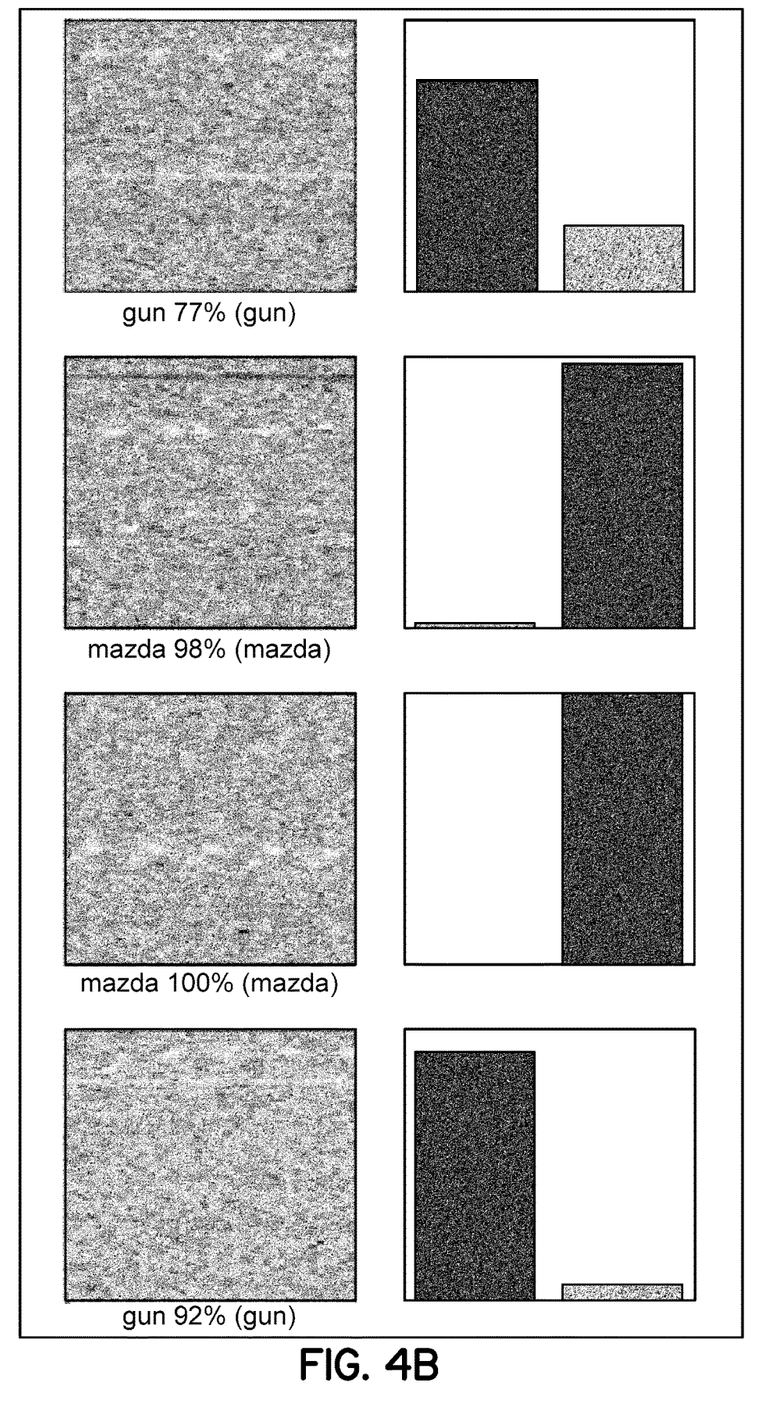
Figure 4C:
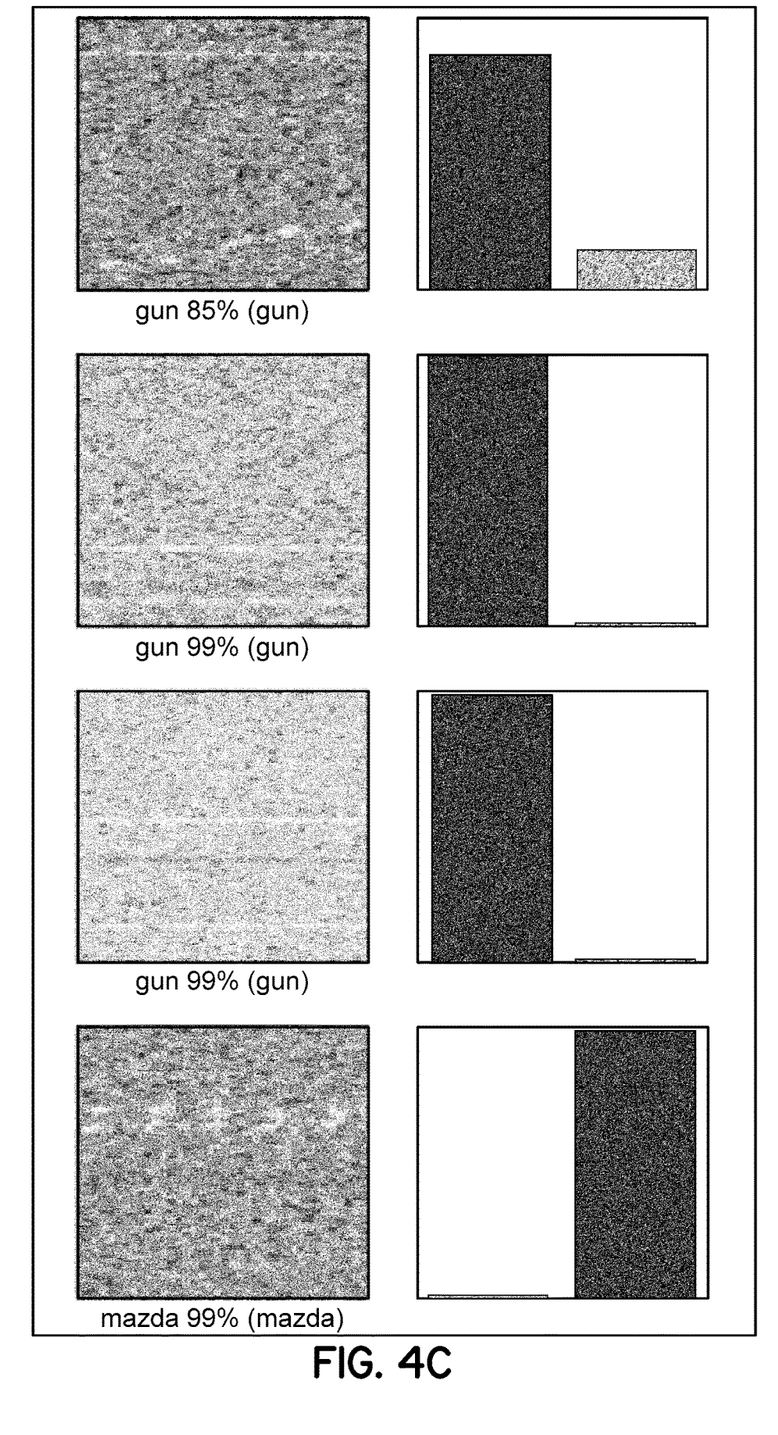

FIGS. 4A, 4B and 4C illustrate the results of the proof of concept neural network working to discriminate these driver assistance radar signals (non-law enforcement sources) and stationary speed cameras from a radar gun (law enforcement source). Each FIG. illustrates spectra delivered to the neural network and the resulting assessment of that incoming radar signal. In the example illustrated, the spectra delivered to the neural network may have up to one instance of any of several radar sources, such as a radar guns from Decatur, vehicle systems from a Cadillac Escalade, Ford Expedition, and Mazda, a Mesta Fusion radar gun (e.g., from Idemia traffic enforcement radar), radar guns from MultaRadar Compact Distance (MRCD)/MultaRadar CT frequency modulated radar, and radar guns from Redflex. These radar sources are overlaid on top of each other in the spectra. The neural network employs multiclass and multilabel, where every class of radar emitter is classified individually.

In other experiments, one gun spectrum, 2 gun spectra, 1 Mazda spectrum, 2 Mazda spectra, and one gun spectrum and 1 Mazda spectrum were evaluated. Any arbitrary amount of classes or labels of spectra could have been similarly evaluated. Notably, whenever there is at least one radar gun spectrum in the signal, the neural network identifies that spectrum and classifies the input as from a radar gun.

Notably, the neural network used in this proof of concept experiment receives only time domain data. The spectrum of that time domain signal is included in the FIGS. to allow illustration of the content being delivered to the neural network.

Figure 5:
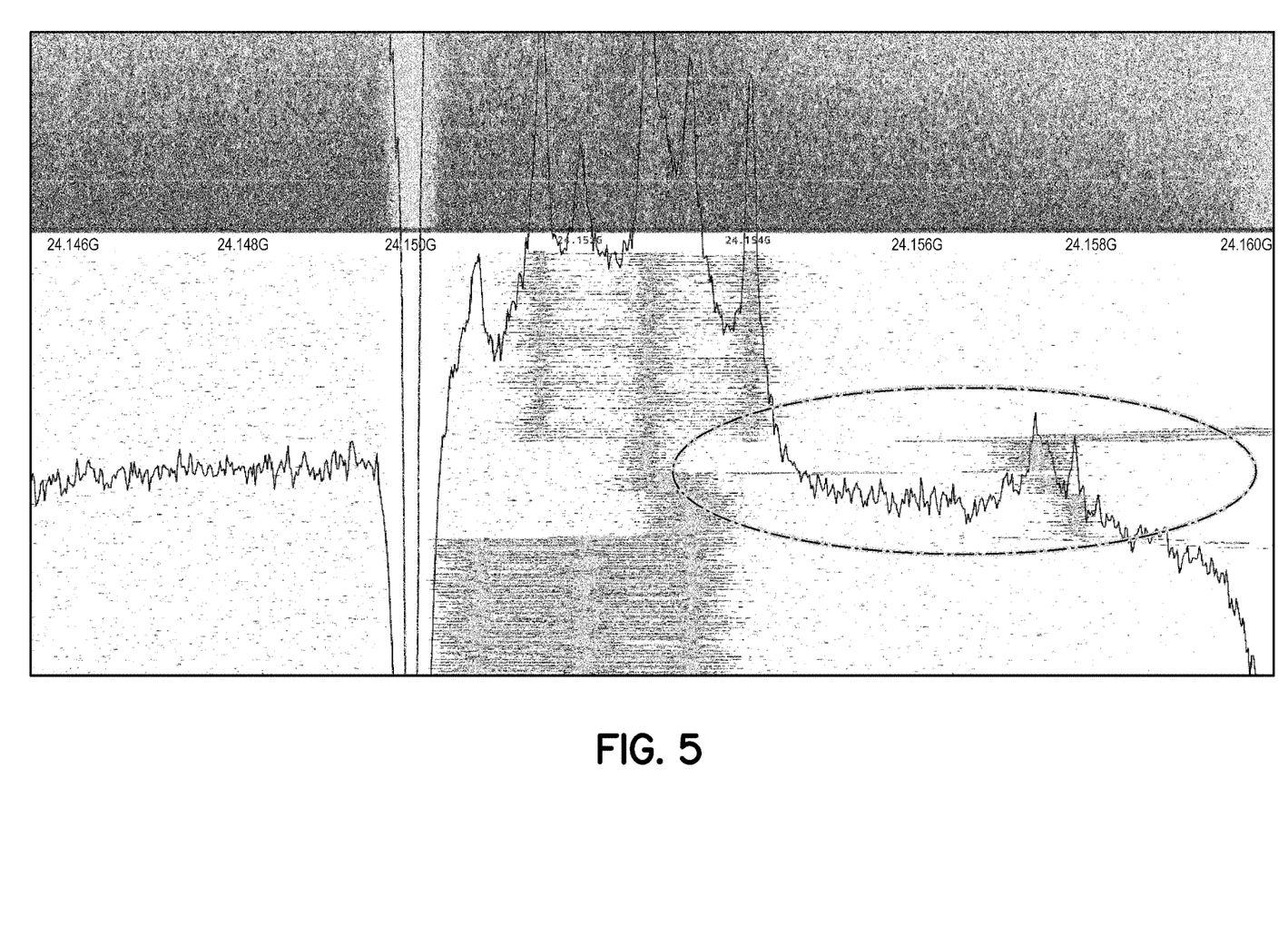
FIG. 5 illustrates the effect of decimation of the signal input to the neural network in accordance with principles of the present invention.

FIG. 5 illustrates the potential for downsampling of incoming radar data and the effects of doing so. The 1st row show the radar gun and Cadillac at the full sampling rate at N=10 k samples. The 2nd row shows how the frequencies are all shifted down due to aliasing/downsampling. But note how the 3 frequencies are still present in the Cadillac with only N=1 k samples. These 3 signals would not be present in N=1 k samples at 30 MHz sample rate because not enough time elapses for the Cadillac to "frequency hop". The 3rd row illustrates the signal to noise ratio effect of including more samples (N=10 k) and fewer samples (3 MHz). A greater number of samples appears to reduce the noise floor but does not excessively obscure the signal. An optimal downsampling level can be found that increases processing time without unduly compromising the noise floor.

Figure 6:
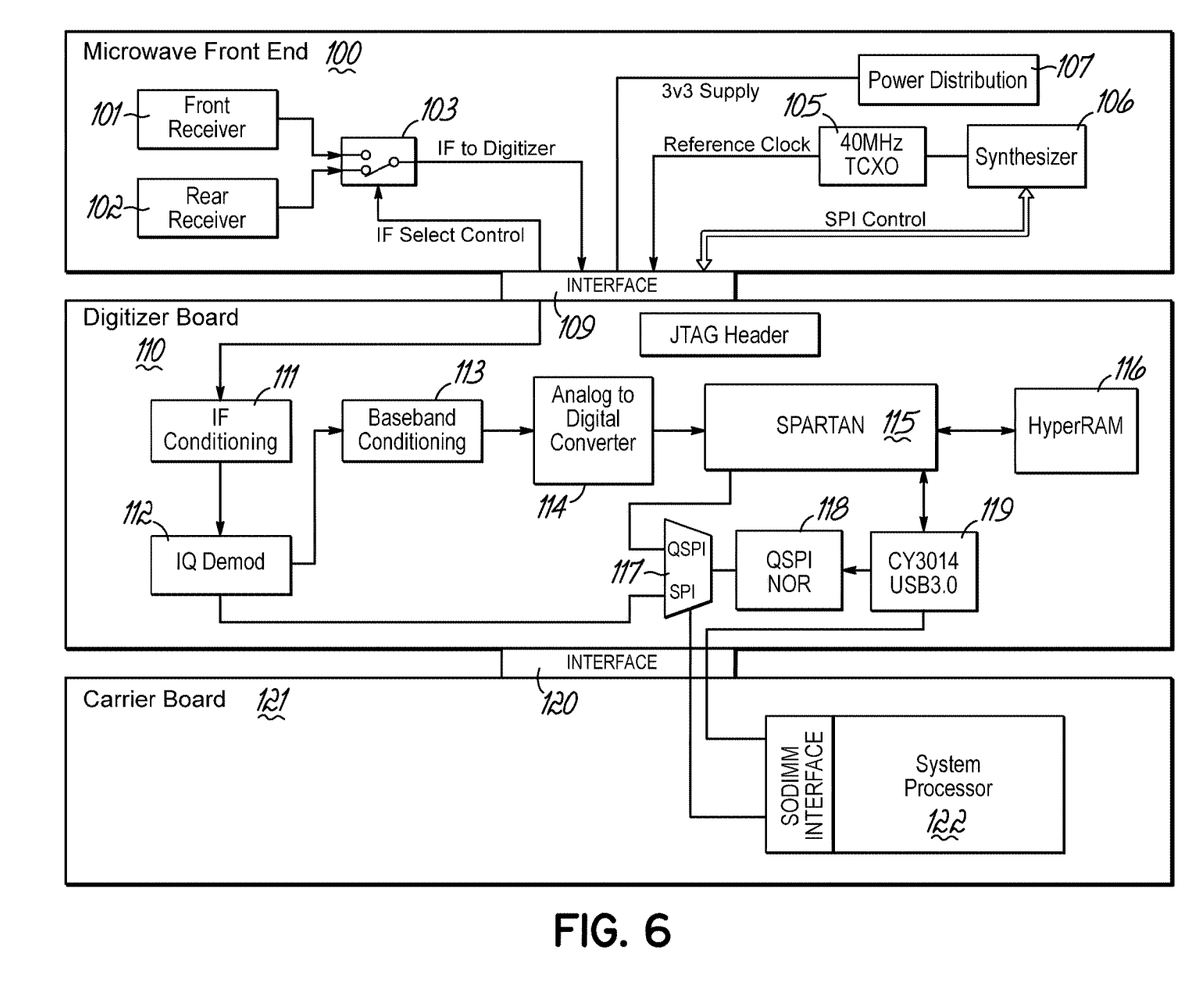
FIG. 6 is a high level circuit diagram for a digitizer board in one embodiment of the present invention.

Turning now to FIG. 6, a circuit level implementation of a device in accordance with principles of the present invention features a Microwave Front End 100, Digitizer Board 110 and Carrier Board 121. The microwave front end includes a front facing receiver 101 and rear facing receiver 102, which demultiplex signals from respective front and rear antennae to an Intermediate Frequency (IF) band, and couple that IF signal to an IF multiplexer 103.

Multiplexer 103 is controlled by an IF Select Control signal (using a serial peripheral interface standard), which is passed to the multiplexer 103 through front end interface 109. The multiplexer allows the digitizer 115 and system processor 122 to collaborate to analyze signals from the front and rear antennae in a time multiplexed fashion, and the selected IF signals are delivered through interface 109 to Digitizer Board 110, e.g., at a frequency of 960 MHz-1040 MHz, +10 dBm Nominal and 50Ω Nominal impedance.

Microwave Front End 110 further includes a system clock circuit 105 using a temperature compensated crystal oscillator (TXCO) producing a 40 MHz system clock for the other circuits of the device; a synthesizer 106 produces the necessary clock frequencies for operation of the remaining circuits, as controlled by an SPI (Serial Peripheral Interface) control signal exchange. Specifically, the Microwave Front End board 100 may present the Digitizer Board with a 40 MHz single-ended clock signal, which acts as the Spartan 7 FPGA 115 reference clock. The clock signal is routed to reduce mutual interference between adjacent lines. The line terminates at the FPGA and in one embodiment is not made available at the Carrier Board interface.

Power to the microwave front end is supplied via a power rail, e.g. at 3.3 volts, 800 mA, supplied to a power distribution network 107 via interface 109.

Power to the Digitizer Board 110 may be provided by two power rails from the carrier board 121, a first at 3.3 V, 2.33 A and a second at 5.0 V, 0.8 A.

The Digitizer Board 110 presents a single GPIO control line to the Microwave Front End board 100. This control line originates from the Spartan 7 FPGA 115 and carriers a switch control signal to the IF signal selector 103. This signal is isolated from the FPGA I/O bank with a buffer/driver device to ensure adequate drive strength and eliminate the possibility of radiated EMI from affecting the FPGA.

This is a 3.3 Volt single-ended signal. This signal shall be routed in such a way that it is not prone to interference from adjacent data or clock lines. This line should be conditioned with capacitive decoupling networks to ensure that it does not carry switching noise into the Microwave Front End.

The Digitizer Board 110 handles I/Q baseband conversion and sampling of 960 MHz-1 GHz intermediate frequency (IF) received from the Microwave Front End 100. Digitizer Board renders samples to an FPGA to run several DSP operations against the sample stream, and then off-load the results over a USB 3.0 interface for processing downstream. In one embodiment, SuperSpeed differential pairs are furnished for full duplex USB communication. In addition, a USB 2.0 differential pair is present. USB Ground is shared with power supply ground, and no dedicated VBUS is furnished.

On Digitizer Board 110, the processing of incoming IF signals is controlled by IF signal conditioning controller 111. IF Signal Conditioning 111 controls the signal parameters of the IF input signal from the microwave front end, and sets the ideal gain, band-pass filtering, and matching to drive the I/Q Baseband Converter.

The conditioned IF signal is delivered to the I/Q Baseband Demodulator 112, which is responsible for converting the band-limited, gain controlled IF to a pair of quadrature baseband signals to be conditioned and sampled by baseband analog to digital converters 113. In one embodiment, the I/Q Baseband Demodulator may be the Maxim MAX2120 Direct-Conversion Tuner. This device has an integrated PLL with VCO, and is capable of translating the approximately 960 MHz-1040 MHz IF directly to I/Q Baseband. The datasheet for this device can be seen at https://datasheets.maximintegrated.com/en/ds/MAX2120.pdf Demodulated baseband signals from I/Q Demodulator 112 are delivered to an ADC Conditioning Network 113, which comprises a matching and anti-aliasing filter (AAF) network, which conditions the output of the I/Q Baseband Demodulator 112 for sampling. The anti-aliasing LPF filter network prior to the baseband ADC may be used to eliminate frequency content above the Nyquist rate of the system. The output of this ADC Conditioning Network 113 is thus conditioned to fit the input requirements of the ADC input and to include common-mode input values within the ADCs operating range.

The baseband Analog to Digital Converter 114 samples the filtered and conditioned I/Q baseband signals to provide samples to the FPGA 115. The circuits of this interface comprise differential clocks to and from the FPGA, an exclusive SPI communication bus, and a parallel CMOS data bus in a configuration to carry sampled data. An exemplary baseband Analog to Digital converter is the Analog Devices AD9248-65. The datasheet for this device can be seen at https://www.analog.com/mediden/technical-documentation/data-sheets/AD9248.pdf.

FPGA 115 coordinates ADC sampling, DSP operations on the incoming sample stream, and controls a USB 3.0 to FIFO interface device for transporting processed samples to the system processor 122.

The FPGA portion of the layout routes differential signal nets to and from the ADC 114, routes single-ended signal nets to and from the USB 3.0 controller 119, implements differential clock interfaces with the microwave front end Reference Clock 105 and/or Synthesizer 106, interacts with HyperRam 116 via a 12-bit HyperBus memory interface, and forwards processed signals via a Quad-SPI configuration flash interface.

The QSPI configuration memory interface utilizes a bus multiplexer 117 to allow the System Processor to capture control of the configuration memory for firmware updates. The System Processor will have control of the multiplexer select line, only asserting bus control when updating configuration memory contents. The default mux state allows the FPGA to boot directly from the memory device.

The FPGA in one embodiment is implemented as a Xilinx Spartan 7 XC7S50-1FTGB196C FPGA, the datasheet for which can be seen at https://www.xilinx.com/support/documentation/data_sheets/ds180_7Series_Overview.pdf. The HyperRAM in one embodiment is implemented using Cypress S27KS0641 HyperRAM, the data sheet for which can be seen at https://www.cypress.com/file/183506/download. The Serial NOR in one embodiment is implemented using a Micron MT25QL128ABA Serial NOR, the data sheet for which can be seen at https://www.mouser.com/datasheet/2/671/MT25Q_QLHS_L_128_ABA_0-1287003.pdf.

A USB 3.0 to FIFO controller 119 moves sample and control traffic between the system processor 122 and the FPGA 115. The USB 3.0 Controller exposes a 32-bit wide parallel data bus to the FPGA 115 as a FIFO interface, acting as a USB protocol translator between that FIFO interface and the system processor 122. This is a bidirectional interface with several flow control signals between the FPGA and USB controller to negotiate read and write traffic. The width of this bus and the speed of the interface is implemented with trace length matching and appropriate FPGA package pin assignment to eliminate timing skew.

The USB 3.0 traffic on the serial side of device 119 includes of a pair of high-speed (5 GHz) differential signals that transfer from the Digitizer Board 110 via a board-to-board interconnect interface 120. In one embodiment, the USB 3.0 interface 119 is implemented using a Cypress CYUSB3012 SuperSpeed USB to FIFO Interface, the data sheet for which can be seen at https://www.cypress.com/part/cyusb3012-bzxc.

Figure 7:
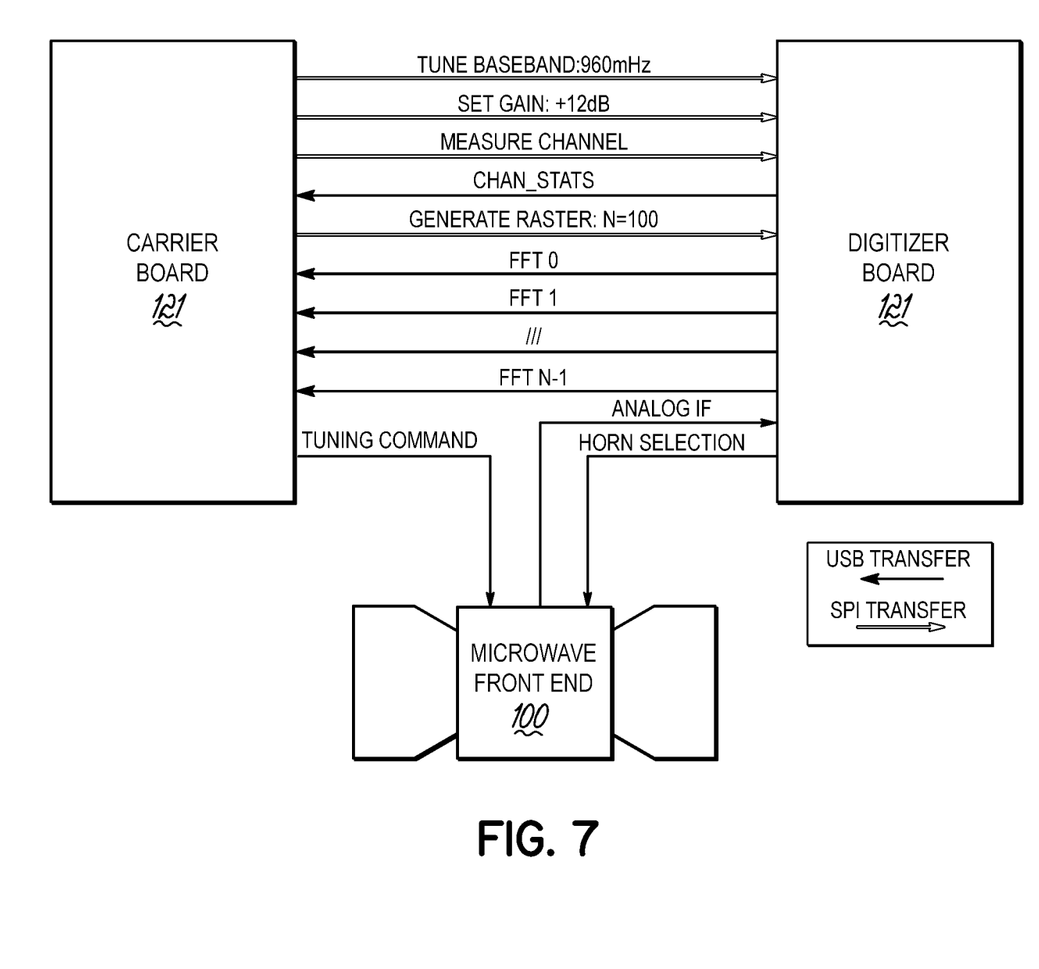
FIG. 7 is a logical block diagram of the embodiment of FIG. 6.

Referring now to FIG. 7, the system illustrated in FIG. 6 implements a front end tuning strategy operative on selected channels of incoming microwave signals. Specifically, the system processor on carrier board 121 issues commands using SPI transfer protocol to control the digitizer board and microwave front end to implement the strategy. Signals delivered to the digitizer board on SPI interface include control signals for baseband tuning (e.g., 960 MHz), gain (e.g., +12 dB), channel to be measured and raster generate commands.

The Digitizer board provides return signals responsive to these commands over USB 3.0 communications, including channel statistics (CHAN_STATS), and n FFT outputs (FFT_0 through FFT_N−1) for processing.

The Microwave Front End 100 receives tuning commands from Carrier Board 121 and a horn selection signal from Digitizer Board 110 and delivers Analog Intermediate Frequency (IF) output to Digitizer Board 110.

For implementation of the tuning strategy, the spectrum of microwave signals of potential interest is divided into 52 channels, numbered 0 through 51. Channels 0 and 1 represent the X radar band, having a 10.5125 GHz center frequency and 122.88 MHz span, which is divided into two channels of 61.44 MHz each. Channels 2 through 15 represent the K radar band, having a 23.925 GHz center frequency and 860.160 MHz span, which is divided into 14 channels of 61.44 MHz each. Finally, channels 16 through 51 represent the Ka radar band, having a 34.750 GHz center frequency and 2211.840 MHz span, which is divided into 36 sub-bands of 61.44 MHz bandwidth.

For context, within the K band there are a number of particular channels that are frequently occupied by particular radiating sources of interest. Specifically channels 11-13 (24.048-24.232 MHz), and particularly channel 12 (24.109-24.170 MHz) are common for continuous wave police radar sources. Channels 7-12 (23.802-24.170 MHz) are common for MultaRadar (frequency modulating) MRCD and MRCT emitters, particularly channels 9-12 (23.925-24.170 MHz). Mesta Fusion sources are common in channels 10-13 (23.986-24.232 MHz) and particularly in channels 10-11 (24.048-24.170 MHz). Redflex sources are seen in channels 9-11 (23.925-24.109 MHz) and particularly channels 10-11 (23.986-24.109 MHz). Particular focus can be brought upon these channels where necessary to enhance detection of these particular emitters.

Channels are processed by the following logic under the control of the system processor 122 in carrier board 121:

A. For each channel, identify whether there is microwave energy present in the channel.
B. If so, identify frequency bins in the channel contain microwave energy and update threat matrix database with data from channel.
C. Repeat for each channel in a running control loop.

Each channel tuning step is preferably completed within about 800 microseconds, for a total tuning time of the entire channel bandwidth of 41.6 milliseconds.

The output of this processing loop, presented for processing, is a continuously updated threat matrix, which is a database of channels with metadata attached to it, including identification of bin number in the channel, amplitude changes, and the like, as well as GPS and other metadata.

The threat matrix is used in conjunction with a K/Ka Band Contextual Map, which is a database of frequencies of threats and geographies in which they occur.

Each channel having active signal is then processed by a threat detector thread, performing the following steps:

A. Check energy distribution of the threat among the channel's bins to determine whether the signal is continuous wave (CW) or frequency modulated continuous wave (FMCW).
B. Evaluate the signal context in the contextual map to determine whether the signal represents a possible threat in the geography of relevance. If not, then terminate processing.
C. If the signal represents a possible threat, if it is CW signal, initiate a user alert.
D. If the signal is FMCW, then deliver a raster of the threat signal to the neural network/AI processor for inferential processing.
E. If the AI engine indicates the signal is not a threat, terminate processing.
F. If the AI engine indicates the signal is a threat, then generate a user alert.
G. Maintain monitoring the threat matrix database for statistical trends in the signal strength or frequency, until a threshold criterion is met to terminate the threat monitoring, and then terminate the thread.

The threat matrix thus reflects signal content for each active channel. For enhancement of the threat matrix the system board simultaneously provides contextual metadata to the threat matrix database including information such as GPS, Time of day/Date, Ambient Light Conditions, accelerometer data, and additional sensor data.

Figure 8:
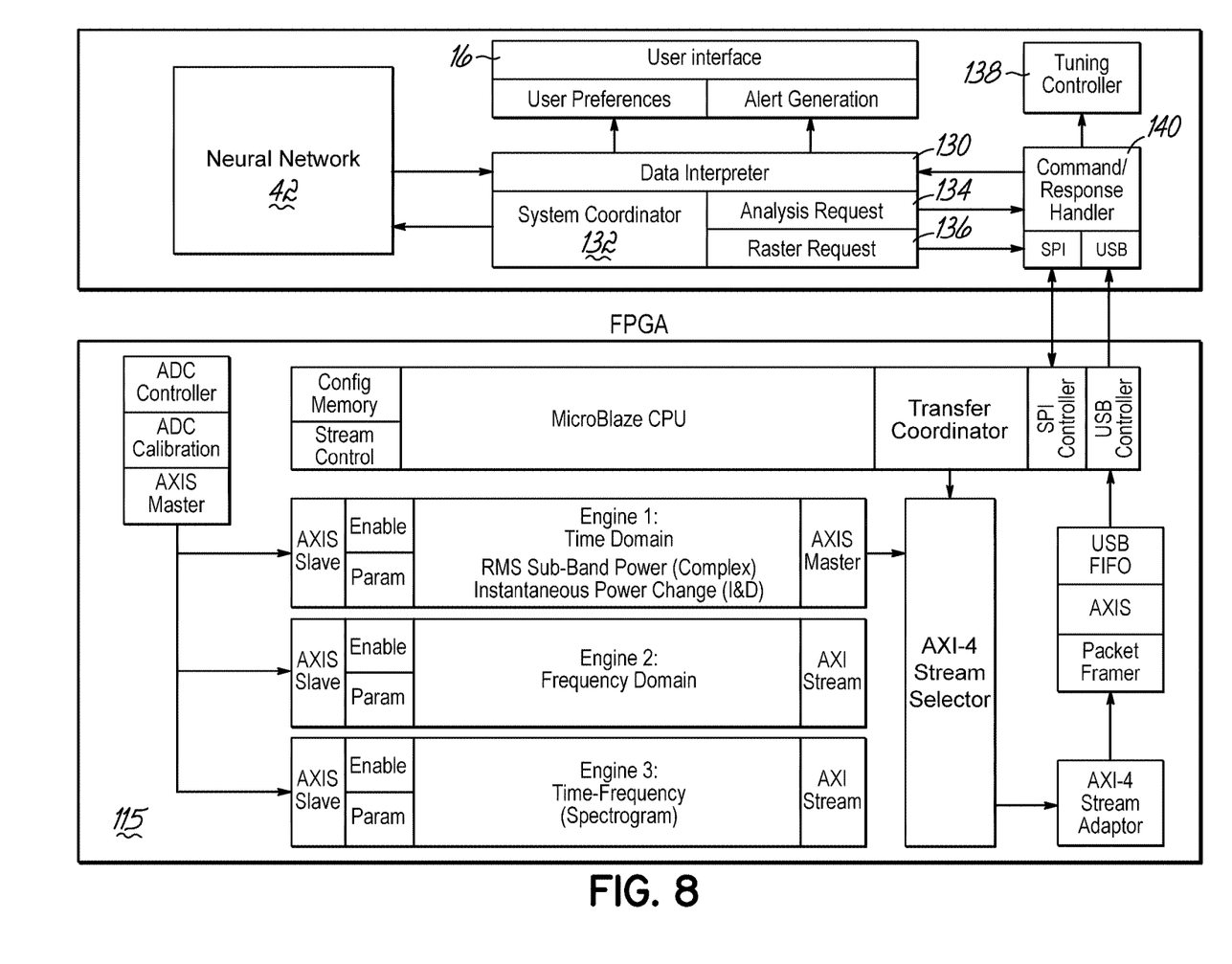
FIG. 8 is an information flow diagram of the embodiment of FIG. 6.

Referring now to FIG. 8, the logical flow of signal information of the exemplary device of FIG. 6 is useful to understand the cooperative functioning of the system processor, peripheral circuits, FPGA, and neural network.

The overall processing activity of the system that is outlined above is orchestrated by a Data Interpreter 130 and System Coordinator 132 implemented in the System Processor 122. These modules generate Analysis Requests 134 for handling by the FPGA 115 and also originate Raster Requests 136 when a particular signal is to be analyzed by the Neural Network 42.

Analysis Requests are handled by the Command/Response Handler 140, which orchestrates tuning of incoming signal via Tuning Controller 138 and further orchestrates analysis by the FPGA 115 via commands sent over the SPI interface to the Digitizer Board.

Upon command, the Digitizer Board 110 acquires incoming signal information into FPGA 115 from the Analog/Digital Converter 114 (FIG. 6) under control of the ADC controller and ADC Calibration blocks of the FPGA 115. This data is then delivered as an AXIS stream under the control of the ADC controller/calibration blocks, to one, two or all of three processing engines:

Engine 1 performs Time Domain analysis of the incoming signal to develop RMS Sub-Band complex power data and instantaneous power change information.

Engine 2 performs Frequency Domain (Fourier Transform) analysis of the incoming signal.

Engine 3 performs Time-Frequency (Spectrogram) analysis of the incoming signal.

The output of Engines 1, 2 and 3 are delivered as a result AXIS stream via a stream selector and stream adapter to a packet framer which arranges the resulting data for delivery via a USB FIFO and controller to the USB interface of the Carrier Board for handling by the Command/Response Handler 140.

In the event a particular signal is to be analyzed by Neural Network 42, a Raster Request 136 is delivered from System Coordinator via the SPI interface to the FPGA 115 which returns the requested Raster, which is then delivered to Neural Network 42 for analysis. The resulting analytical response from Neural Network 42 then informs the decision to initiate Alerts via the User Interface 16. The user interface may also be used to define User Preferences for altering the operation of the system; e.g., by engaging or disengaging various band monitors or filters. Furthermore, in a learning mode, the User Interface can obtain information from a user indicating feedback on the appropriateness or quality of an alert determination in order to improve the operation of the Neural Network.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A radar detector, comprising
   a. a radar receiver for receiving and characterizing the signal characteristics of a radar signal generated remotely from the receiver, wherein the received radar signal includes signals generated remotely by one or more law enforcement sources, or signals generated remotely by one or more non-law enforcement sources, or both, the radar receiver using a local oscillator that is not synchronized to any of said sources to provide an output comprising one or more of radar frequency, radar intensity and radar direction,
   b. a control system coupled to the radar receiver and receiving the output thereof, the control system comprising a neural network structured in multiple layers each processing signal characteristics delivered thereto to develop neural pathways associated with the distinguishing signatures of the signal characteristics of remotely generated signals from law enforcement sources or remotely generated signals from non-law enforcement sources, or both, when provided to the neural network,
   wherein the control system identifies the presence, or absence, of a remotely generated signal from a law enforcement source based upon the distinguishing signatures of signal characteristics associated with neural pathways within the neural network, and communicates the result of the identification as a radar detection output.

2. The radar detector of claim 1 further comprising a geopositioning system for identifying a geoposition of the radar detector, and producing an output representative of the geoposition of the radar detector, wherein the control system receives the geoposition output and delivers the geoposition to the neural network, the neural network developing neural pathways associated with distinguishing signatures and positions of the radar detector provided to the neural network.

3. The radar detector of claim 2 wherein the geopositioning system is a satellite-based Global Positioning System (GPS) receiver.

4. The radar detector of claim 1 further comprising a vehicle motion detecting system for detection of one or more of vehicle velocity, braking, acceleration, collision or cornering for a vehicle in which the radar detector is deployed, producing an output representative of vehicle motion, wherein the control system receives the vehicle motion output and provides vehicle motion information to the neural network, the neural network developing neural pathways associated with distinguishing signatures and vehicle motions relating to signals provided to the neural network.

5. The radar detector of claim 4 wherein the vehicle motion detecting system comprises an accelerometer sensor.

6. The radar detector of claim 1 further comprising a vehicle environmental sensor for detection of characteristics of the surrounding environment of a vehicle in which the radar detector is deployed, the vehicle environmental sensor producing an output representative of the vehicle environment, wherein the control system receives the vehicle environment output and provides vehicle environment information to the neural network, the neural network developing neural pathways associated with distinguishing characteristics and vehicle environments relating to signals provided to the neural network.

7. The radar detector of claim 6 wherein the vehicle environmental sensor comprises one or more of audio from a microphone, temperature from an ambient temperature sensor, video from one or more vehicle mounted camera, video from a dashboard camera, proximity information from one or more vehicle mounted proximity sensors, proximity information from a dashboard mounted sensor, and ambient temperature from a temperature sensor.

8. The radar detector of claim 1 wherein the control system further receives vehicle operating data of a vehicle in which the radar detector is deployed, the neural network developing neural pathways associated with distinguishing characteristics and vehicle operating data relating to signals provided to the neural network.

9. The radar detector of claim 8 wherein the vehicle operating data comprises one or more of vehicle identification number (VIN), vehicle make, vehicle model, vehicle model year, vehicle engine RPM, vehicle engine, climate, driver assistance or chassis control system status, and vehicle information accessible from a vehicle data bus.

10. The radar detector of claim 8 wherein the vehicle information is accessible from a vehicle data bus via an OBD connector.

11. The radar detector of claim 1, wherein the neural network comprises two or more convolutional layers each having a kernel.

12. The radar detector of claim 11 wherein at least one kernel of a convolutional layer is trained to detect one or more of specific frequencies of a radar signal, specific combinations of different frequencies of a radar signal, specific combinations of different frequencies at different relative amplitudes of a radar signals, and specific transients, or changes in frequency and amplitude, of a radar signal.

13. The radar detector of claim 1, wherein the radar receiver produces a frequency spectrum characterization of a radar signal by mixing a swept frequency demodulating signal with an incoming radar signal, the swept frequency demodulating signal sweeping a frequency range to produce an intermediate frequency sweep signal, and wherein the radar receiver output delivered to the neural network comprises intermediate frequency sweep signals produced by the radar receiver during plural sweeps of the frequency range.

14. The radar detector of claim 13 wherein the neural network identifies differences in spectral content at corresponding locations in the plural sweeps of the frequency range, to identify characteristics of the changes in frequency and intensity of an incoming radar signal with respect to time.

15. The radar detector of claim 14 wherein the neural network identifies frequency modulated or intermittent signal patterns based upon frequency range sweeps.

16. The radar detector of claim 1, wherein the neural network comprises recurrent neural networks.

17. The radar detector of claim 1 wherein the neural network comprises long short-term memory layers.

18. A method of training and deploying a neural network in a radar detector, comprising
   a. training the neural network via delivery of radar receiver outputs generated by a radar receiver in response to known-origin signals, such that the neural network develops neural pathways to recognize the known-origin radar signals and becomes a trained neural network, and
   b. deploying the trained neural network on a radar detector comprising a radar receiver providing an output characterizing a received radar signal generated remotely to the receiver and the neural network, wherein the received radar signal includes signals generated remotely by one or more law enforcement sources, or signals generated remotely by one or more non-law enforcement sources, or both, and the radar receiver using a local oscillator that is not synchronized to any of said sources to provide said output to the neural network;
   c. wherein the deployed radar detector utilizes the developed neural pathways to classify incoming radar signals as law enforcement radar or non-law enforcement originated sources, and from this determination filters false alert signals during operation.

19. The method of claim 18 wherein the known-origin radar signals include those known to originate from law enforcement radar sources.

20. The method of claim 18 wherein the known-origin radar signals include those known to originate from non-law enforcement sources.

21. The method of claim 18 wherein the known-origin signals are produced via laboratory simulation of known publicly-occurring radar signals.

22. The method of claim 18 wherein the known-origin signals are produced via collection of publicly-occurring radar signals.

23. The method of claim 18 further comprising improving the initially trained neural network subsequent to deployment thereof, by improving neural pathways based upon characteristics of signals encountered by the deployed neural network.

24. The method of claim 23 wherein signals encountered by the deployed neural network are characterized as law enforcement-originated or non-law enforcement-originated by a user of the deployed radar detector, such that neural pathways of the radar detector may be used to discriminate law enforcement-originated radar signals from non-law enforcement radar signals.

25. The method of claim 23 wherein the improved neural pathways discriminate radar signals unique to a geographic area in which the neural network is deployed.

26. The method of claim 23 wherein the improved neural pathways discriminate radar signals unique to the circumstances in which the neural network is deployed.

27. The method of claim 26 wherein the circumstances in which the neural network is deployed comprise one or more of radar signals originated by a host in which the neural network is deployed and radar signals originated by other vehicles or fixed or mobile sources in the geographic area where the neural network is deployed.

28. The method of claim 23 further comprising connecting the deployed radar detector to a host device, the host device receiving details of the improved neural pathways created in the deployed neural network.

29. The method of claim 18 further comprising connecting the deployed radar detector to a host device, the host device updating the neural pathways of the deployed neural network.

30. The method of claim 29 wherein the updated neural pathways were developed at least in part by a second deployed neural network in a second deployed radar detector.

* * * * *

UNITED STATES PATENT AND TRADEMARK OFFICE
CERTIFICATE OF CORRECTION

PATENT NO. : 12,241,997 B2
APPLICATION NO. : 17/614980
DATED : March 4, 2025
INVENTOR(S) : Jonathan Dandrow et al.

It is certified that error appears in the above-identified patent and that said Letters Patent is hereby corrected as shown below:

In the Specification

Column 1, Line 56, delete:
"... layers including, but not limited to; convolutional layers, ...",
Insert:
--... layers including, but not limited to, convolutional layers, ...--.

Column 2, Line 12, delete:
"... consist of, but not limited to, the ...",
Insert:
--... consist of, but is not limited to, the ...--.

Column 2, Line 22, delete:
"... consist of, but is not limited to, the following; ...",
Insert:
--... consist of, but are not limited to, the following:--.

Column 2, Line 24, delete:
".... time of day) the suggested ....",
Insert:
--.... time of day), the suggested ...--.

Column 2, Lines 34-35, delete:
"... those known to originated either from law ...",
Insert:
--... those known to originate either from law ...--.

Column 3, Line 57, delete:
"FIGS. 4A, 4B and 4C illustrates spectra ...",

Signed and Sealed this
Twenty-second Day of July, 2025

Coke Morgan Stewart
*Acting Director of the United States Patent and Trademark Office*

Insert:
--FIGS. 4A, 4B and 4C illustrate spectra ...--.

Column 6, Line 35, delete:
"... such as a radar guns from Decatur, ...",
Insert:
--... such as radar guns from Decatur, ...--.

Column 7, Lines 43-44, delete:
"... and carriers a switch control ...",
Insert:
--... and carries a switch control ...--.

In the Claims

Column 12, Line 42-43; Claim 7, Lines 4-5, delete:
"... video from one or more vehicle mounted camera, video from ...",
Insert:
--... video from one or more vehicle mounted cameras, video from ...--.

Column 13, Line 3; Claim 12, Line 5, delete:
"... relative amplitudes of a radar signals, and specific transients, ...",
Insert:
--... relative amplitudes of a radar signal, and specific transients, ...--